US008554401B2

(12) United States Patent
Satake et al.

(10) Patent No.: US 8,554,401 B2
(45) Date of Patent: Oct. 8, 2013

(54) SAFETY DEVICE FOR HYDRAULIC WORKING MACHINE

(75) Inventors: Hidetoshi Satake, Ishioka (JP); Katsuaki Kodaka, Abiko (JP); Yuuki Gotou, Tsuchiura (JP); Yuuji Nagashima, Tsuchiura (JP); Kazuhiro Ichimura, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 943 days.

(21) Appl. No.: 12/528,994

(22) PCT Filed: Feb. 28, 2008

(86) PCT No.: PCT/JP2008/053531

§ 371 (c)(1),
(2), (4) Date: Aug. 27, 2009

(87) PCT Pub. No.: WO2008/105501

PCT Pub. Date: Sep. 4, 2008

(65) Prior Publication Data

US 2010/0100274 A1 Apr. 22, 2010

(30) Foreign Application Priority Data

Feb. 28, 2007 (JP) ................................ 2007-050756

(51) Int. Cl.
*G06F 7/00* (2006.01)
*G06F 11/30* (2006.01)

(52) U.S. Cl.
USPC ....... 701/29.1; 701/29.2; 701/30.5; 701/30.7; 701/30.8; 701/30.9; 701/50

(58) Field of Classification Search
USPC .................... 701/29.1, 29.2, 30.5, 30.7, 30.8, 701/30.9, 50
See application file for complete search history.

(56) References Cited

U.S. PATENT DOCUMENTS 5,024,489 A * 6/1991 Tanaka et al. ..................... 303/3
5,159,813 A * 11/1992 Yoshimatsu et al. ............ 60/459

(Continued)

FOREIGN PATENT DOCUMENTS

EP 1 662 054 A1 5/2006
EP 1 686 217 A1 8/2006

(Continued)

OTHER PUBLICATIONS

International Search Report dated Apr. 8, 2008 (Two (2) pages). U.S. Office Action dated Sep. 11, 2012 of copending U.S. Appl. No. 12/528,946.
European Search Report dated Jul. 10, 2013 (Ten (10) pages).

*Primary Examiner* — Khoi Tran
*Assistant Examiner* — Jorge Peche
(74) *Attorney, Agent, or Firm* — Crowell & Moring LLP

(57) ABSTRACT

There are provided: control valves 22-24 that control flow of pressure oil from the hydraulic source 21 to the hydraulic actuators 15-17; electric lever devices 51-53 that output electrical operation signals v51-v53 in correspondence to lever operation; electromagnetic proportional valves 25-30 through which control pressures for controlling the control valves 22-24 are output; a pressure calculating unit 50 that calculates control pressures P25-P30 in correspondence to the operation signals V51-v53; a control unit 50 that controls the electromagnetic proportional valves 25-30 so that control pressures to be output from the electromagnetic proportional valves 25-30 become the control pressures P25-P30 that have been calculated; a high-pressure selection circuit 41-44 that selects a higher pressure between control pressures that have been output from the electromagnetic proportional valves 25-30; pressure detectors 45 and 46 that detect a control pressure selected by the high-pressure selection circuit 41-44; an abnormality determination unit 50 that determines an abnormality in the electromagnetic proportional valves 25-30 based upon the control pressure detected by the pressure detectors 45 and 46 and the control pressure calculated by the pressure calculating unit; and an inhibiting device 47 and 48 that prohibits control of the control valves 22-24 when it is determined that an abnormality has occurred in the electromagnetic proportional valves 25-30.

6 Claims, 10 Drawing Sheets

(56) References Cited

U.S. PATENT DOCUMENTS

| | | | | | |
|---|---|---|---|---|---|
| 5,221,125 | A | * | 6/1993 | Okochi et al. | 303/10 |
| 5,490,384 | A | | 2/1996 | Lunzman | |
| 5,636,516 | A | * | 6/1997 | Kon | 60/466 |
| 5,791,229 | A | * | 8/1998 | Lee et al. | 91/453 |
| 5,848,531 | A | * | 12/1998 | Nakamura et al. | 60/426 |
| 6,389,808 | B1 | * | 5/2002 | Sakai | 60/422 |
| 6,425,450 | B1 | * | 7/2002 | Lansberry | 180/9.36 |
| 6,474,063 | B2 | * | 11/2002 | Sawada et al. | 60/426 |
| 6,564,549 | B2 | * | 5/2003 | Nagura et al. | 60/436 |
| 7,478,530 | B2 | | 1/2009 | Ueda | |
| 7,725,222 | B2 | * | 5/2010 | Endo et al. | 701/22 |
| 2002/0029566 | A1 | * | 3/2002 | Sawada et al. | 60/459 |
| 2002/0033639 | A1 | * | 3/2002 | Mizutani et al. | 303/113.1 |
| 2003/0140530 | A1 | * | 7/2003 | Ichimura et al. | 37/347 |
| 2009/0115247 | A1 | * | 5/2009 | Leiber et al. | 303/154 |
| 2010/0016123 | A1 | * | 1/2010 | Kodaka et al. | 477/186 |

FOREIGN PATENT DOCUMENTS

| | | | | |
|---|---|---|---|---|
| JP | 6-264905 | A | | 9/1994 |
| JP | 6-316951 | A | | 11/1994 |
| JP | 6-346905 | A | | 12/1994 |
| JP | 7-19207 | A | | 1/1995 |
| JP | 9-89515 | A | | 4/1997 |
| JP | 10-147958 | A | | 6/1998 |
| JP | 2000-265498 | A | | 9/2000 |
| JP | 2003-213731 | A | | 7/2003 |
| JP | 2003-301480 | A | | 10/2003 |
| JP | 2004-92841 | A | | 3/2004 |
| JP | 2004-107938 | A | | 4/2004 |
| JP | 2004-116727 | A | | 4/2004 |
| JP | 2004116727 | A | * | 4/2004 |

* cited by examiner

SAFETY DEVICE FOR HYDRAULIC WORKING MACHINE

TECHNICAL FIELD

The present invention relates to a safety device for hydraulic working machine that is operated through an electric lever.

BACKGROUND ART

There is a device known in the related art that drives an electromagnetic proportional valve in correspondence to the operation amount of an electric lever and applies pilot pressure generated thereby to a control valve so as to drive a hydraulic actuator (refer to, for example, patent reference literature 1). In the device disclosed in Patent Reference Literature 1, pilot pressure applied to the control valve is detected by a pressure sensor. The device calculates control pressure in correspondence to the operation amount of the electric lever and compares the detected pressure with the control pressure so as to make a decision as to an abnormality in the electromagnetic proportional valve. If it is decided that an abnormality has occurred in the electromagnetic proportional valve, the device stops driving the hydraulic actuator.

Patent Reference Literature 1: Japanese Laid Open Patent Publication No. H7-19207

DISCLOSURE OF THE INVENTION

Problems to be Solved by the Invention

However, since pilot pressure applied to the control valve is detected by the pressure sensor, the device disclosed in Patent Reference Literature 1 requires a multitude of sensors, thereby increasing the cost.

Means for Solving the Problems

A safety device for hydraulic working machine according to the present invention comprises: a hydraulic source; a hydraulic actuator that is driven by pressure oil from the hydraulic source; a control valve that controls a flow of pressure oil from the hydraulic source to the hydraulic actuator; an electric lever device that outputs an electrical operation signal, which is a drive instruction for the hydraulic actuator, in correspondence to lever operation; first and second electromagnetic proportional valves through which control pressures for controlling the control valve are output; a pressure calculating unit that calculates first and second control pressures in correspondence to an operation signal that is output from the electric lever device; a control unit that controls the first and second electromagnetic proportional valves so that control pressures to be output from the first and second electromagnetic proportional valves become the first and second control pressures that have been calculated by the pressure calculating unit; a high-pressure selection circuit that selects a higher pressure between control pressures that have been output from the first and second electromagnetic proportional valves; a pressure detector that detects a control pressure selected by the high-pressure selection circuit; an abnormality determination unit that determines an abnormality in the first and second electromagnetic proportional valves based upon the control pressure detected by the pressure detector and the first and second control pressure calculated by the pressure calculating unit; and an inhibiting device that prohibits the first and second electromagnetic proportional valves from controlling the control valve when the abnormality determination unit determines that an abnormality has occurred in the first and second electromagnetic proportional valves.

A safety device for hydraulic working machine according to the present invention comprises: a hydraulic source; at least first and second hydraulic actuators that are driven by pressure oil from the hydraulic source; first and second control valves that control flow of pressure oil from the hydraulic source to the first and second hydraulic actuators; first and second electric lever devices that output electrical operation signals, which are drive instructions for the first hydraulic actuator and the second hydraulic actuator respectively, in correspondence to lever operation; first and second electromagnetic proportional valves through which control pressures for controlling the first control valve are output; third and fourth electromagnetic proportional valves through which control pressures for controlling the second control valve are output; a pressure calculating unit that calculates a first and second control pressures in correspondence to an operation signal that is output from the first electric lever device, and calculates a third and fourth control pressures in correspondence to an operation signal that is output from the second electric lever device; a control unit that controls the first and second electromagnetic proportional valves so that control pressures to be output from the first and second electromagnetic proportional valves become the first and second control pressures that have been calculated by the pressure calculating unit, and controls the third and fourth electromagnetic proportional valves so that control pressures to be output from the third and fourth electromagnetic proportional valves become the third and fourth control pressures that have been calculated by the pressure calculating unit; a first high-pressure selection circuit that selects a higher pressure between control pressures that have been output from the first and second electromagnetic proportional valves; a second high-pressure selection circuit that selects a higher pressure between control pressures that have been output from the third and fourth electromagnetic proportional valves; a first pressure detector that detects a control pressure selected by the first high-pressure selection circuit; a second pressure detector that detects a control pressure selected by the second high-pressure selection circuit; an abnormality determination unit that determines an abnormality in the first and second electromagnetic proportional valves based upon the control pressure detected by the first pressure detector and the first and second control pressures calculated by the pressure calculating unit, and determines an abnormality in the third and fourth electromagnetic proportional valves based upon the control pressure detected by the second pressure detector and the third and fourth control pressures calculated by the pressure calculating unit; and an inhibiting device that prohibits the first and second electromagnetic proportional valves from controlling the first control valve when the abnormality determination unit determines that an abnormality has occurred in the first and second electromagnetic proportional valves, and prohibits the third and fourth electromagnetic proportional valves from controlling the second control valve when the abnormality determination unit determines that an abnormality has occurred in the third and fourth electromagnetic proportional valves.

A safety device for hydraulic working machine according to the present invention comprises: a hydraulic source; at least first and second hydraulic actuators that are driven by pressure oil from the hydraulic source; first and second control valves that control flow of pressure oil from the hydraulic source to the first and second hydraulic actuators; first and second electric lever devices that output electrical operation signals, which are drive instructions for the first hydraulic actuator and second hydraulic actuator respectively, in correspondence to lever operation; first and second electromagnetic proportional valves through which control pressures for controlling the first control valve are output; third and fourth electromagnetic proportional valves through which control pressures for controlling the second control valve are output; a pressure calculating unit that calculates first and second control pressures in correspondence to an operation signal that is output from the first electric lever device, and calculates third and fourth control pressures in correspondence to an operation signal that is output from the second electric lever device; a control unit that controls the first and second electromagnetic proportional valves so that control pressures to be output from the first and second electromagnetic proportional valves become the first and second control pressures that have been calculated by the pressure calculating unit, and controls the third and fourth electromagnetic proportional valves so that control pressures to be output from the third and fourth electromagnetic proportional valves become the third and fourth control pressures that have been calculated by the pressure calculating unit; a high-pressure selection circuit that selects a maximum control pressure from among control pressures that have been output from the first to fourth electromagnetic proportional valves; a pressure detector that detects a control pressure selected by the high-pressure selection circuit; an abnormality determination unit that determines an abnormality in the first to fourth electromagnetic proportional valves based upon the control pressure detected by the pressure detector and the first to fourth control pressures calculated by the pressure calculating unit; and an inhibiting device that prohibits the first to fourth electromagnetic proportional valves from controlling the first and second control valves when the abnormality determination unit determines that an abnormality has occurred in the first to fourth electromagnetic proportional valves.

A safety device for hydraulic working machine according to the present invention comprises: a hydraulic source; at least first, second, and third hydraulic actuators that are driven by pressure oil from the hydraulic source; first, second, and third control valves that control flow of pressure oil from the hydraulic source to the first, second, and third hydraulic actuators, respectively; first, second, and third electric lever devices that output electrical operation signals, which are drive instructions for the first, second, and third hydraulic actuators respectively, in correspondence to lever operation; first and second electromagnetic proportional valves through which control pressures for controlling the first control valve are output; third and fourth electromagnetic proportional valves through which control pressures for controlling the second control valve are output; fifth and sixth electromagnetic proportional valves through which control pressures for controlling the third control valve are output; a pressure calculating unit that calculates first and second control pressures in correspondence to an operation signal that is output from the first electric lever device, third and fourth control pressures in correspondence to an operation signal that is output from the second electric lever device, and fifth and sixth control pressures in correspondence to an operation signal that is output from the third electric lever device; a control unit that controls the first to sixth electromagnetic proportional valves so that control pressures to be output from the first to sixth electromagnetic proportional valves respectively become the first to sixth control pressures that have been calculated by the pressure calculating unit; a first high-pressure selection circuit that selects a maximum control pressure from among control pressures that have been output from the first to fourth electromagnetic proportional valves; a second high-pressure selection circuit that selects a higher pressure between control pressures that have been output from the fifth and sixth electromagnetic proportional valves; a first pressure detector that detects the control pressure selected by the first high-pressure selection circuit; a second pressure detector that detects the control pressure selected by the second high-pressure selection circuit; an abnormality determination unit that determines an abnormality in the first to fourth electromagnetic proportional valves based upon the control pressure detected by the first pressure detector and the first to fourth control pressures calculated by the pressure calculating unit, and determines an abnormality in the fifth and sixth electromagnetic proportional valves based upon the control pressure detected by the second pressure detector and the fifth and sixth control pressures calculated by the pressure calculating unit; and an inhibiting device that prohibits the first to fourth electromagnetic proportional valves from controlling the first and second control valves when the abnormality determination unit determines that an abnormality has occurred in the first to fourth electromagnetic proportional valves, and prohibits the fifth and sixth electromagnetic proportional valves from controlling the third control valve when the abnormality determination unit determines that an abnormality has occurred in the fifth and sixth electromagnetic proportional valves.

It is preferable that the first and second hydraulic actuators are actuators for performing one operation, and that the third hydraulic actuator is an actuator for performing another operation.

In this case, it is possible that the hydraulic working machine includes an undercarriage, a revolving superstructure, a work front that is rotatably supported by the revolving superstructure, and a working attachment that is removably attached to the work front; and that the first and second hydraulic actuators are driving actuators for the working attachment.

Advantageous Effect of the Invention

According to the present invention, a decision as to an abnormality in the electromagnetic proportional valve is made based upon a detected value of the control pressure selected by a high-pressure selection circuit and a corresponding calculated value of the control pressure, therefore the number of pressure sensor can be decreased, thereby decreasing the cost.

BEST MODE FOR CARRYING OUT THE INVENTION

The following is an explanation of an embodiment of a safety device for hydraulic working machine according to the present invention, given in reference to FIGS. 1-10.

Figure 1:
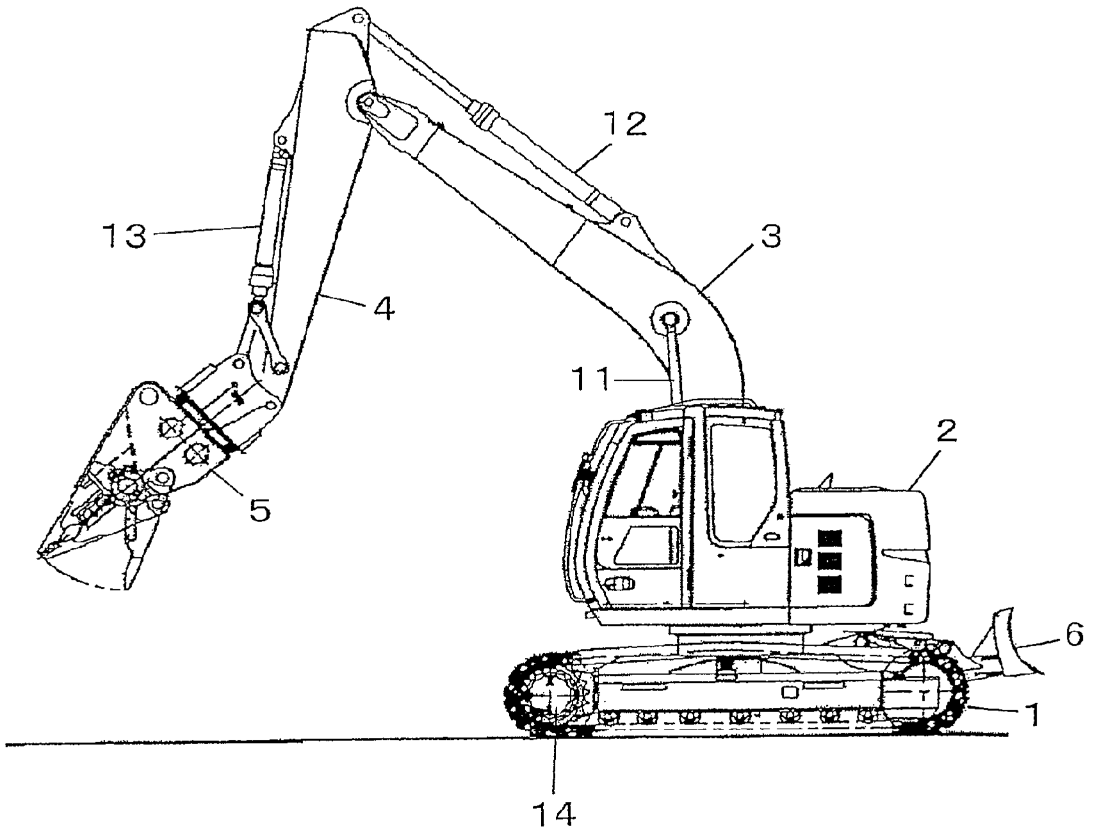
FIG. 1 shows an external side view of a crusher to which a safety device according to an embodiment of the present invention is applied.

FIG. 1 is an external side view of a crusher, which is an example of a hydraulic working machine to which the safety device according to the present embodiment is applied. The crusher, which is configured based upon a hydraulic excavator, includes an undercarriage 1, a revolving superstructure 2 rotatably mounted on top of the undercarriage 1, a boom 3 rotatably provided on the revolving superstructure 2, an arm 4 rotatably provided on the distal end of the boom, and a crusher attachment 5 rotatably provided on the distal end of the arm. A blade 6 is attached to the undercarriage 1 as an optional component. It is to be noted that, in place of the attachment 5, a bucket is attached to a standard hydraulic excavator.

The boom 3 is vertically rotatably supported by a boom cylinder 11. The arm 4 is vertically rotatably supported by an arm cylinder 12. The attachment 5 is vertically rotatably supported by a bucket cylinder 13. The undercarriage 1 is driven by right and left hydraulic motors 14 for traveling. A standard hydraulic excavator initially includes hydraulic actuators such as the cylinders 11 to 13 and the motors 14. In addition, as FIG. 2 shows, in the present embodiment, a hydraulic cylinder 15 that opens/closes the distal end of the attachment 5, a hydraulic motor 16 that rotates the attachment 5 relative to the arm 4, and a hydraulic cylinder 17 that drives the blade 6 are included as optional hydraulic actuators.

The standard hydraulic actuators 11 to 14 are driven by hydraulic pilot system. More specifically, a pressure reducing valve is actuated by operating a control lever provided for each of the actuators 11 to 14 so as to generate pilot pressure, and direction control valves (not figured herein) are each switched by the pilot pressure so as to drive the hydraulic actuators 11 to 14. On the other hand, if the hydraulic pilot system is adopted to drive the optional hydraulic actuators 15 to 17, a circuit structure would be complicated. Therefore, not a hydraulic pilot type actuator but an electric lever type actuator is adopted in the optional hydraulic actuators 15~17 so that each actuator is operated by an electric lever.

Figure 2:
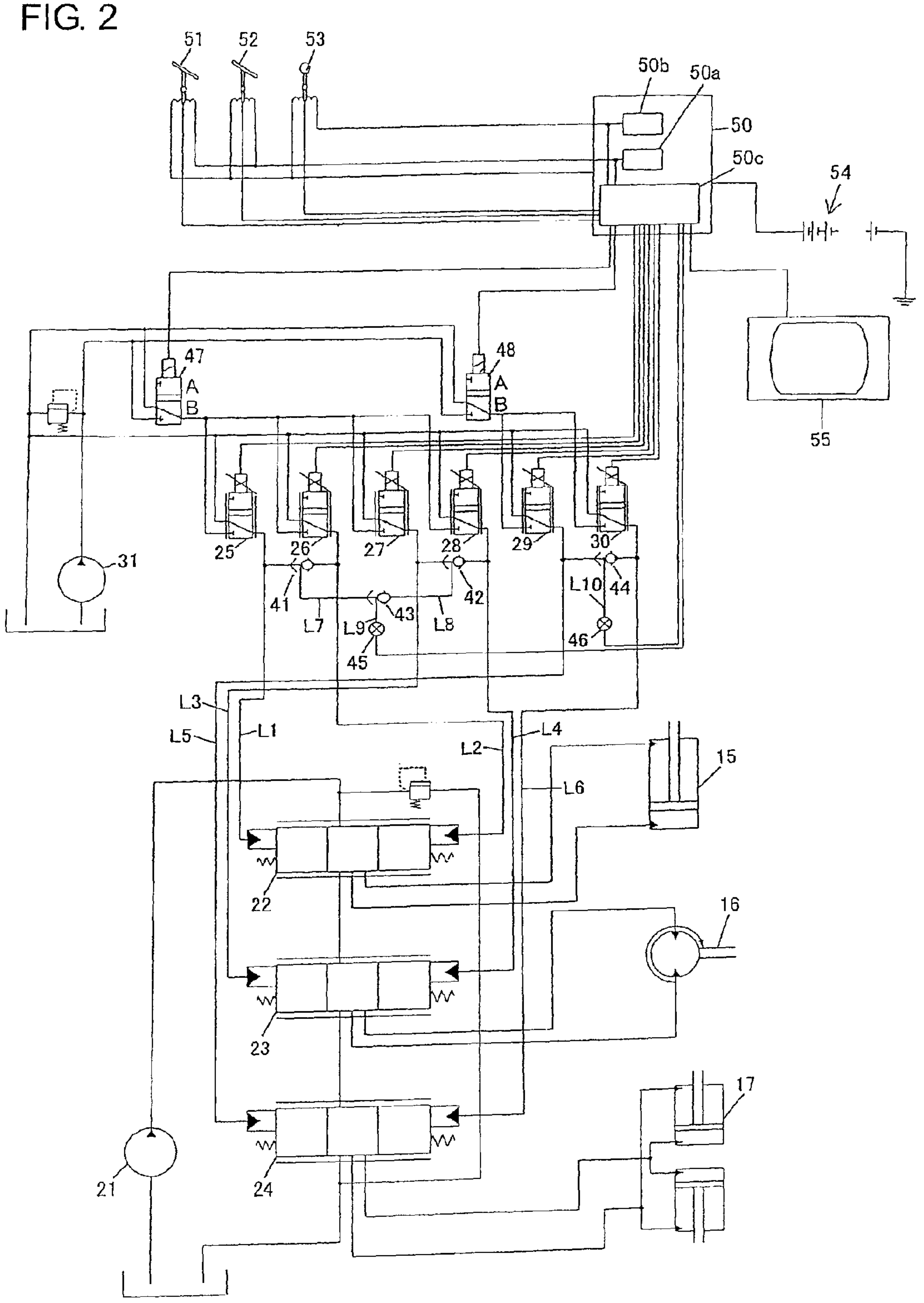
FIG. 2 is a hydraulic circuit diagram showing a configuration of the safety device according to the present embodiment.

FIG. 2 is a hydraulic circuit diagram showing the configuration of the safety device according to the present embodiment, in particular, presenting a drive circuit of the hydraulic actuators 15 to 17 which are driven by electric lever system. Pressure oil from a hydraulic pump 21 being driven by an engine (not figured herein) is supplied to the hydraulic actuators 15 to 17 through direction control valves 22 to 24, respectively. Pressure of pressure oil from a pilot pump 31 is reduced by electromagnetic proportional pressure reducing valves (hereinafter called electromagnetic proportional valves) 25 to 30 and the pressure oil is applied to each pilot port of the direction control valves 22 to 24, so that the pilot pressure switches the direction control valves 22 to 24.

An electric lever 51 that instructs open/close movement of the attachment 5, an electric lever 52 that instructs rotational movement of the attachment 5, and an electric lever 53 that instructs drive of the blade 6 are connected to a controller 50. A predetermined voltage vx (e.g., 5v) is applied from a power supply circuit 50*a* in the controller 50 to the electric levers 51 and 52, whereas a predetermined voltage (e.g., 5v) is applied from a power supply circuit 50*b* to the electric lever 53. The electric levers 51 to 53 are variable resistance electric levers, in which resistance value varies in correspondence to the operation amount, and electric signals in correspondence to the operation amount of the electric levers 51 to 53 are input to a control circuit 50*c* in the controller 50. The controller 50 includes a processing unit including a CPU, a ROM, a RAM, other peripheral circuits, and so on. It is to be noted that a reference numeral 54 represents a battery that supplies the controller 50 with power at a predetermined voltage (e.g., 24V).

Figure 3:
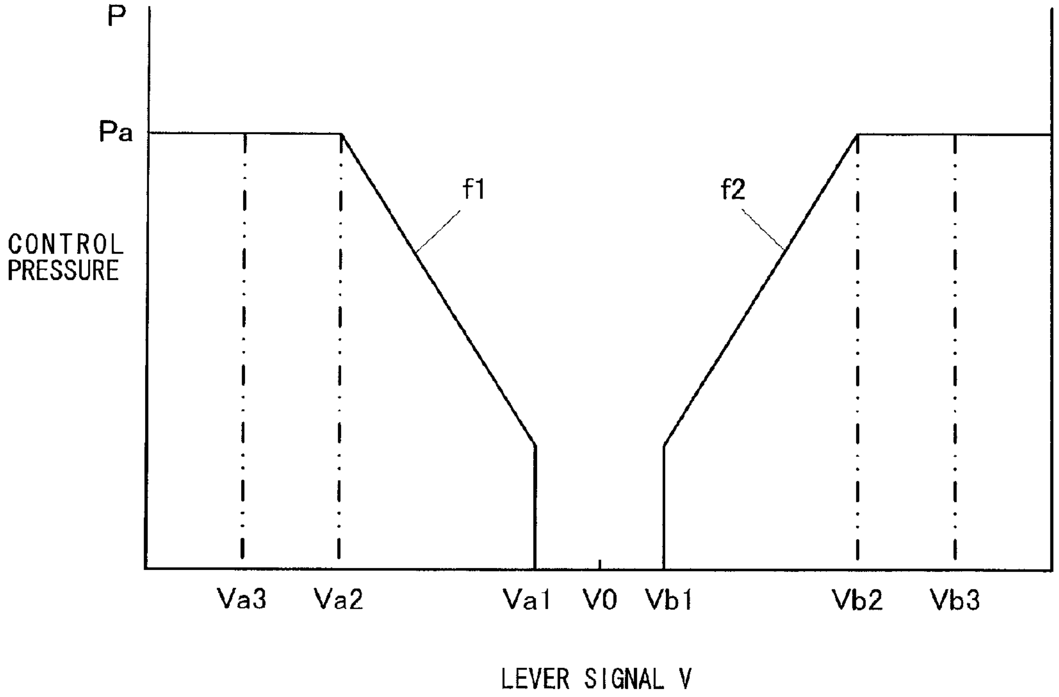
FIG. 3 shows an example of output characteristics of an electromagnetic proportional valve.

FIG. 3 shows the relationship between a lever signal v being output from the electric levers 51 to 53 and control pressure P corresponding to the lever signal. Characteristics f1 and f2 are stored in the controller 50 in advance as lever characteristics to be achieved when the electric levers 51 to 53 operate normally. The characteristic f1 is that of control pressure P which is output to the electromagnetic proportional valves 25, 27, and 29, whereas the characteristic f2 is that of control pressure which is output to the electromagnetic proportional valves 26, 28, and 30. The control circuit 50*c* controls the electromagnetic proportional valves 25 to 30 so that pilot pressure applied to the control valves 22 to 24 becomes control pressure P corresponding to the lever signal v.

In FIG. 3, the lever signal is v0 (e.g., 2.5v) when a control lever 31, 32 or 33 is in neutral. A dead band, in which control pressure is zero (P=0), is formed in a range where the lever signal v is between va1 (e.g., 2.3v) and vb1 (e.g., 2.7v), including v0 ($va1 \leq v \leq vb1$). The range in which the lever signal v is $va2 \leq v < va1$ and $vb1 < v \leq vb2$ is a control pressure variable region where control pressure P increases with an increase in the operation amount of the control lever 31, 32 or 33 along the characteristics f1 and f2. The range where the lever signal v is $v < va2$ and $vb2 < v$ is the control pressure maximum region where control pressure P is maximum (P=Pa).

In the electric lever type hydraulic circuit which is thus configured, the hydraulic actuators 15 to 17 do not act properly in the case of failure (e.g., when stick occurs) of the electromagnetic proportional valves 25 to 30. Accordingly, in the present embodiment, abnormality in the electromagnetic proportional valves 25 to 30 is monitored in the following manner so as to limit the action of the hydraulic actuators 15 to 17 in the event of a fault. It is to be noted that in the description below the lever signals v of the electric levers 51 to 53 may be respectively indicated by v51 to v53, and control pressure P of the electromagnetic proportional valves 25 to 30 may be respectively indicated by P25 to P30.

As FIG. 2 shows, a shuttle valve 41 is connected to pipelines L1 and L2 that respectively connect the pilot ports of the direction control valve 22 with the electromagnetic proportional valves 25 and 26, and a shuttle valve 42 is connected to pipelines L3 and L4 that respectively connect the pilot ports of the direction control valve 23 with the electromagnetic proportional valves 27 and 28. Pressure oil on the high pressure side of the pipelines L1 and L2 and the pipelines L3 and L4 is guided to pipelines L7 and L8, respectively, through the shuttle valves 41 and 42. In addition, a shuttle valve 43 is connected to the pipelines L7 and L8 so as to guide pressure oil on the high pressure side of the pipelines L7 and L8 to a pipeline L9. Pressure of the pressure oil guided to the pipeline L9, in other words, the maximum pressure P1 in the pipelines L1 to L4 is detected by a pressure sensor 45. The shuttle valves 41 to 43 and the pressure sensor 45 constitute a first abnormality detection circuit that detects abnormality in the electromagnetic proportional valves 25 to 28.

A shuttle valve 44 is connected to pipelines L5 and L6 that respectively connect the pilot ports of the direction control valve 24 with the electromagnetic proportional valves 29 and 30, and pressure oil on the high pressure side of the pipelines L5 and L6 is guided to a pipeline L10 through the shuttle valve 44. Pressure of the pressure oil guided to the pipeline L10, in other words, the maximum pressure P2 in the pipelines L5 and L6 is detected by a pressure sensor 46. The shuttle valve 44 and the pressure sensor 46 constitute a second abnormality detection circuit that detects abnormality in the electromagnetic proportional valves 29 and 30.

An electromagnetic switching valve 47 is provided between the pilot pump 31 and the electromagnetic proportional valves 25 to 28, whereas an electromagnetic switching valve 48 is provided between the pilot pump 31 and the electromagnetic proportional valves 29 and 30. The electromagnetic switching valves 47 and 48 operate in response to a signal from the control circuit 50*c*. As the electromagnetic switching valve 47 is switched to the position A, pilot pressure is allowed to flow to the electromagnetic proportional valves 25 to 28, whereas as the electromagnetic switching valve 47 is switched to the position B, pilot pressure is prohibited to flow to the electromagnetic proportional valves 25 to 28. As the electromagnetic switching valve 48 is switched to the position A, pilot pressure is allowed to flow to the electromagnetic proportional valves 29 and 30, whereas as the electromagnetic switching valve 48 is switched to the position B, pilot pressure is prohibited to flow to the electromagnetic proportional valves 29 and 30.

In the above structure, a drive circuit of the hydraulic actuators 15 and 16 that perform one operation (crush operation) and a drive circuit of the hydraulic actuator 17 that performs another operation (blade operation) are grouped separately. Abnormalities in each of the groups are detected by the pressure sensors 45 and 46, respectively. If any abnormality is detected, the electromagnetic switching valve 47 or 48 is operated so as to prohibit driving of the actuators 15 and 16 or the actuator 17 of the group in which the abnormality is detected. In this manner, the two pressure sensors 45 and 46 and the two electromagnetic switching valves 47 and 48, which are smaller than the three hydraulic actuators in number, are provided, thereby achieving efficiency.

Figure 4:
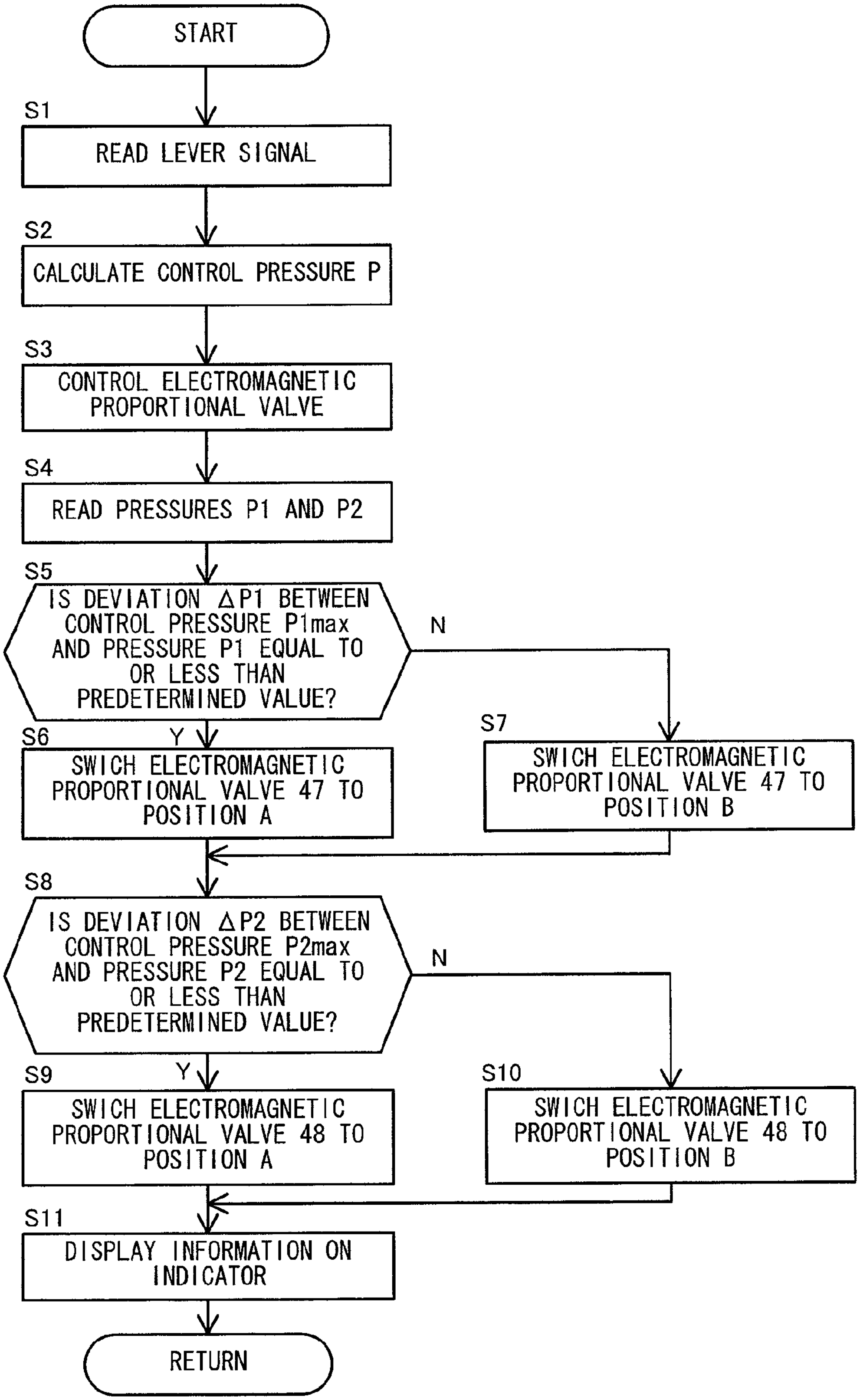
FIG. 4 shows a flowchart of an example of processing that may be executed by the control circuit of FIG. 2.

FIG. 4 is a flowchart of an example of processing that may be executed by the control circuit 50*c* according to the present embodiment. The processing in this flowchart starts, for example, as an engine key switch is turned on. In an initial state, the electromagnetic switching valves 47 and 48 have already been switched to the position A. In a step S1, each of the lever signals v51 to v53 of the electric levers 51 to 53 is read. In a step S2, based upon predetermined characteristics of FIG. 3, each of the control pressures P25 to P30 in correspondence with the lever signals v51 to v53 is calculated. In addition, the maximum value P1max of the control pressures P25 to P28 corresponding to a detected value P1 of the pressure sensor 45 and the maximum value P2max of the control pressures P29 and P30 corresponding to a detected value P2 of the pressure sensor 46 are each calculated. In a step S3, control signals are output to the electromagnetic proportional valves 25 to 30 so that pilot pressures applied to the control valves 22 to 24 become equal to the control pressures P25 to P30. In a step S4, detected values P1 and P2 which are detected by the pressure sensors 45 and 46 are read.

In a step S5, a deviation ΔP1 between the maximum value P1max of the control pressures P25 to P28 and the detected value P1 of the pressure sensor 45 is calculated so as to make a decision as to whether or not the deviation ΔP1 is equal to or less than a predetermined value. This is a process to make a decision as to whether or not an abnormality has occurred in the electromagnetic proportional valves 25 to 28. As long as the deviation ΔP1 is equal to or less than the predetermined value, it is decided that outputs of the electromagnetic proportional valves 25 to 28 are normal.

If an affirmative decision is made in the step S5, the flow of processing proceeds to a step S6. In the step S6, a control signal is output to the electromagnetic switching valve 47 so as to switch the electromagnetic switching valve 47 to the position A. This allows pilot pressure to flow to the electromagnetic proportional valves 25 to 28. On the other hand, if a negative decision is made in the step S5, the flow of processing proceeds to a step S7. In this case, it is decided that the output of any of the electromagnetic proportional valves 25 to 28 which generates the maximum control pressure P1max is abnormal, and a control signal is output to the electromagnetic switching valve 47 so as to switch the electromagnetic switching valve 47 to the position B. This prohibits pilot pressure from flowing to the electromagnetic proportional valves 25 to 28.

In a step S8, a deviation ΔP2 between the maximum value P2max of the control pressures P29 and P30 and the detected value P2 of the pressure sensor 46 is calculated so as to make a decision as to whether or not the deviation ΔP2 is equal to or less than a predetermined value. This is a process to make a decision as to whether or not an abnormality has occurred in the electromagnetic proportional valves 29 and 30. As long as the deviation ΔP2 is equal to or less than the predetermined value, it is decided that outputs of the electromagnetic proportional valves 29 and 30 are normal.

If an affirmative decision is made in the step S8, the flow of processing proceeds to a step S9. In the step S9, a control signal is output to the electromagnetic switching valve 48 so as to switch the electromagnetic switching valve 48 to the position A. This allows pilot pressure to flow to the electromagnetic proportional valves 29 and 30. On the other hand, if a negative decision is made in the step S8, the flow of processing proceeds to a step S10. In this case, it is decided that the output of any of the electromagnetic proportional valves 29 and 30 which generates the maximum control pressure P2max is abnormal, and a control signal is output to the electromagnetic switching valve 48 so as to switch the electromagnetic switching valve 48 to the position B. This prohibits pilot pressure from flowing to the electromagnetic proportional valves 29 and 30. In a step S11, a control signal is output to an indicator 55 (FIG. 2) so as to display abnormality information of the electromagnetic proportional valves 25 to 30.

More specific explanation is now given as to the operation of the safety device according to the first embodiment.

(1) In Normal State

Firstly, the case where all of the electromagnetic proportional valves 25 to 30 operate properly is explained. For instance, when the electric lever 51 is operated so as to output a drive signal to the electromagnetic proportional valve 25 (the step S3), pilot pressure is applied from the pilot pump 31 to the direction control valve 22 through the electromagnetic proportional valve 25. The pilot pressure is also guided to the pipeline L9 through the shuttle valves 41 and 43, and is detected by the pressure sensor 45. At this time, if the electromagnetic proportional valve 25 acts normally, the deviation ΔP1 between the maximum value P1max (=P25) of control pressure at the first abnormality detection circuit and the detected value P1 of pilot pressure is equal to or less than the predetermined value. Therefore, the electromagnetic switching valve 47 is switched to the position A (the step S6) so as to allow pilot pressure to flow to the direction control valve 22, thereby driving the actuator 15 in correspondence to the operation amount of the lever.

For example, when the electric lever 52 is operated so as to output a drive signal to the electromagnetic proportional valve 27, pilot pressure is applied to the direction control valve 23 through the electromagnetic proportional valve 27. The pilot pressure is also guided to the pipeline L9 through the shuttle valves 42 and 43, and is detected by the pressure sensor 45. At this time, if the electromagnetic proportional valve 27 acts normally, the deviation ΔP1 between the maximum value P1max (=P27) of control pressure and the detected value P1 of pilot pressure is equal to or less than the predetermined value. Therefore, the electromagnetic switching valve 47 is switched to the position A so as to allow pilot pressure to flow to the direction control valve 23, thereby driving the actuator 16 in correspondence to the operation amount of the lever. It is to be noted that since operations for the other electromagnetic proportional valves 26 and 28 to 30 are the same, explanations for them are not given herein.

(2) In Abnormal State

The case where the output of at least one of the electromagnetic proportional valves 25 to 30 is abnormal is explained. For instance, in the event that the output of the electromagnetic proportional valve 25 is abnormal, even if a control signal in accordance with the operation amount of the electric lever 51 is output to the electromagnetic proportional valve 25, pilot pressure corresponding to the control pressure P25 does not apply to the direction control valve 22, so that the deviation ΔP1 between the maximum value P1max (=P25) of control pressure and the detected value P1 of pilot pressure becomes greater than the predetermined value. This causes the electromagnetic switching valve 47 to be switched to the position B (the step S7), the pilot ports of the direction control valves 22 and 23 to be communicated with a reservoir, and the direction control valves 22 and 23 to be forcibly switched to a neutral position. As a result, the actuators 15 and 16 are prohibited from driving, so that malfunction of the actuator 15 caused by failure of the electromagnetic proportional valve 25 can be prevented.

At this time, if the outputs of the electromagnetic proportional valves 29 and 30 are normal, the electromagnetic switching valve 48 maintains the position A, which is the initial position (the step S9), and the operation of the actuator 17 in accordance with operation of the electric lever 53 is allowed. Accordingly, even in the case of failure of the electromagnetic proportional valve 25, the operation of the actuator 17, which is unaffected by failure, is not limited, thereby minimizing effect caused by the electromagnetic proportional valve 25.

In the event that the output of the electromagnetic proportional valve 27 is abnormal, even if a control signal in accordance with the operation amount of the electric lever 52 is output to the electromagnetic proportional valve 27, pilot pressure corresponding to the control pressure P27 does not apply to the direction control valve 23, so that the deviation ΔP1 between the maximum value P1max (=P27) of control pressure and the detected value P1 of pilot pressure becomes greater than the predetermined value. This causes the electromagnetic switching valve 47 to be switched to the position B, and the actuator 16 to be prohibited from driving. Therefore, a single pressure sensor 45 can detect not only failure of the electromagnetic proportional valve 25 but also failure of the electromagnetic proportional valve 27, thereby reducing the number of sensors and reducing the costs.

Thus, in the present embodiment, pilot pressures applied to the direction control valves 22 and 23 are detected by the pressure sensor 45 through the shuttle valves 41 to 43, and pilot pressure applied to the direction control valve 24 is detected by the pressure sensor 46 through the shuttle valve 44. This enables the pressure sensors 45 and 46, which are small in number, to detect abnormality in the greater number of the electromagnetic proportional valves 25 to 30 and thus, the safety device can be achieved at low cost.

The electromagnetic switching valve 47 is provided between the electromagnetic proportional valves 25 to 28 and the pilot pump 31, whereas the electromagnetic switching valve 48 is provided between the electromagnetic proportional valves 29 and 30 and the pilot pump 31. When any abnormality in the electromagnetic proportional valves 25 to 30 is detected by the pressure sensors 45 and 46, only the actuator which is acted by the electromagnetic proportional valve in which an abnormality has been detected is prohibited from driving. This prevents the drive of the actuators 15 to 17 from being unnecessarily limited, so that the operation can be continued using the normal electromagnetic proportional valves.

Abnormalities in the actuators 15 and 16 for the attachment are detected by a single pressure sensor 45 through the shuttle valves 41 to 43. More specifically, in this case, if an abnormality has occurred in at least one of the electromagnetic proportional valves 25 to 28, the attachment 5 can not work properly, and therefore the pressure sensor 45 is configured to detect whether or not the attachment 5 can work properly. This further reduces the number of the pressure sensors, thereby achieving efficiency.

In electric lever type drive circuits, failure may occur, not only in the electromagnetic proportional valves 25 to 30, but also in the electric levers 51 to 53 themselves. In that case, the actuators 15 to 17 can not be driven in accordance with the operation amount of the electric levers 51 to 53, which may interfere with the work operation. Therefore, in the present embodiment, the safety device is configured as follows so as to address abnormalities also in the electric levers 51 to 53.

Figure 5:
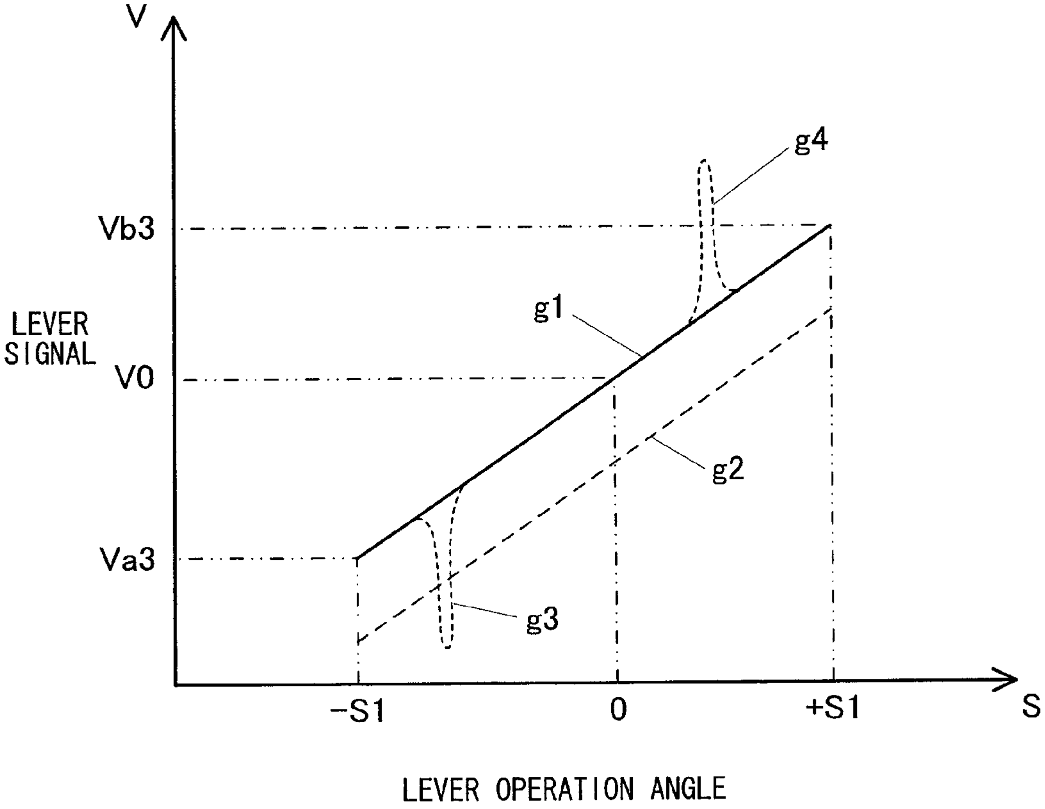
FIG. 5 shows an output characteristics of the electric lever of FIG. 2.

FIG. 5 shows the relationship of the lever signal v with respect to the operation angle s of a electric lever 51, 52 or 53. When the electric lever 51, 52 or 53 works normally, the lever signal v varies along a characteristic g1 (solid line). According to the characteristic g1, the lever signal is v0 when the electric lever 51, 52 or 53 is in neutral (s=0), whereas, the lever signal becomes va3 (e.g., , 0.5v) when the electric lever 51, 52 or 53 is fully operated in one direction (s=−s1), and the lever signal becomes vb3 (e.g., 4.5v) when the electric lever 51, 52 or 53 is fully operated in the opposite direction (s=+s1). It is to be noted that, as FIG. 3 shows, the lever signals va3 and vb3 satisfy the conditions va3 <va2 and vb2<vb3, respectively.

The variable resistance electric levers 51 to 53 slide on resistor patterns provided on the proximal ends of the levers so as to output the lever signal v. Therefore, the patterns may become worn due to the slide of the levers 51 to 53. If the patterns become worn, the output characteristics of the electric levers 51 to 53 shift, for example, as represented by a characteristic g2 (dotted line). On the other hand, since resistance value increases if wear dust of the patterns adheres to a part of the patterns, the lever signal v locally decreases as a characteristic g3 (dotted line) indicates. In contrast, since resistance value decreases if a part of the patterns delaminates, the lever signal v locally increases as a characteristic g4 (dotted line) indicates. In the case where the output is represented by any of the characteristics g2 to g4, an abnormality has occurred in any of the electric levers 51 to 53 themselves.

In this case, output of the lever signal v is limited as follows.

Figure 6:
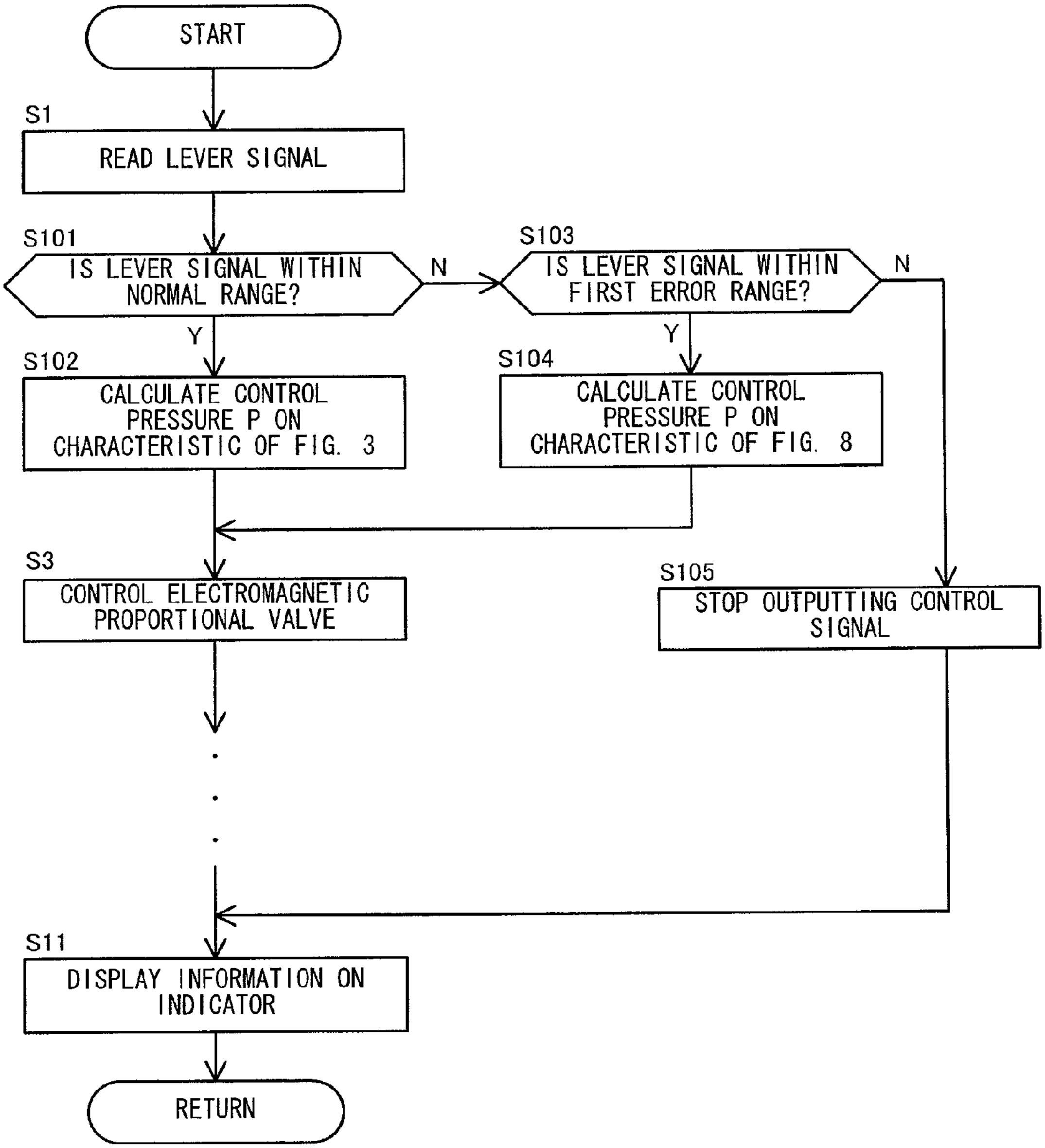
FIG. 6 shows a flowchart presenting an example of a variation of FIG. 4.
Figure 7:
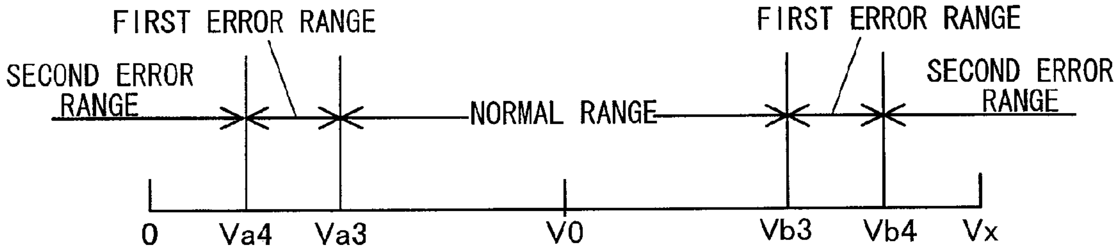
FIG. 7 shows the normal range and error range of an operation signal.

FIG. 6 is an example of a flowchart including processing for addressing abnormalities in the electric levers 51 to 53. In this flowchart, the process executed in the step S2 of FIG. 4 is modified. In other words, upon reading the lever signals v51 to v53 in the step S1, the flow of process proceeds to a step S101 to make a decision as to whether or not the lever signals v51 to v53 are within the normal range. The normal range is, as FIG. 7 shows, a range between va3 and vb3 ($va3 \le v \le vb3$), i.e., a range of the output characteristics g1 in the normal state as shown in FIG. 5. Upon making an affirmative decision in the step S101, the flow of process proceeds to a step S102 to calculate the control pressures P25 to P30 based upon the characteristics f1 and f2 of FIG. 3. Then, in the step S3, the electromagnetic proportional valves 25 to 30 are controlled so that pilot pressures applied to the control valves 22 to 24 become equal to the control pressures P25 to P30.

Figure 8:
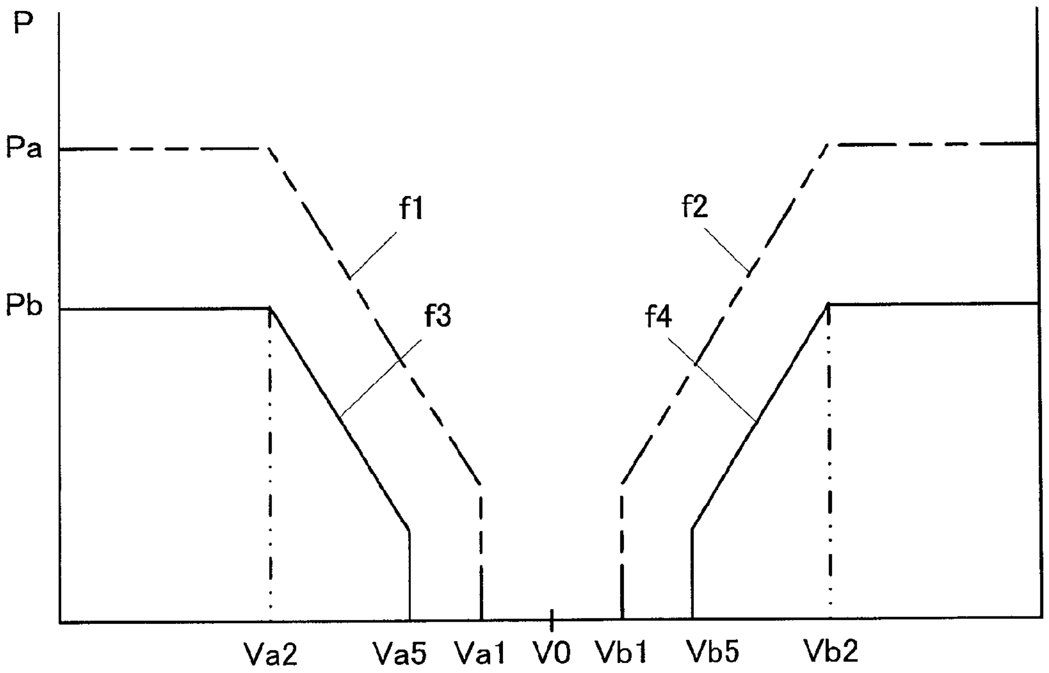
FIG. 8 shows another example of output characteristics of an electromagnetic proportional valve.

On the other hand, upon making a decision in the step S101 that the lever signals are not within the normal range, the flow of process proceeds to a step S103 to make a decision as to whether or not the lever signals are within the first error range. The first error range is, as FIG. 7 shows, a range of va4 (e.g., 0.4v)$\le v <$va3 and a range of vb3$< v \le$vb4 (e.g., 4.6v), i.e., ranges beyond the normal range by a predetermined value (e.g., 0.1v). The first error range is set so as to correspond to the characteristics g2 to g4 of FIG. 5. Upon making an affirmative decision in the step S103, the flow of process proceeds to a step S104, to calculate the control pressures P25 to P30 based upon the characteristics f3 and f4 as shown in FIG. 8. Then, in the step S3, the electromagnetic proportional valves 25 to 30 are controlled so that pilot pressures applied to the control valves 22 to 24 become equal to the control pressures P25 to P30.

The characteristic f3 shown in FIG. 8 is a characteristic of control pressure to be output to the electromagnetic proportional valves 25, 27, and 29, whereas the characteristic f4 is a characteristic of control pressure to be output to the electromagnetic proportional valves 26, 28, and 30. In FIG. 8, a dead band is formed in a range of $va5 \le v \le vb5$, where control pressure is zero (P=0). This dead band is wider than the normal dead band ($va1 \le v \le vb1$). The range in which the lever signal v is between va2 and va5 ($va2 \le v \le va5$) and between vb5 and vb2 ($vb5 \le v \le vb2$) is a control pressure variable region where control pressure P increases with an increase in the operation amount of the control levers 51 to 53 along the characteristics f3 and f4. The range where the lever signal is $v \le va2$ and $vb2 \le v$ is the control pressure maximum region where control pressure P is maximum (P=Pb). The maximum control pressure Pb in the abnormal state is smaller than the maximum control pressure Pa in the normal state. For example, Pb is approximately 0.4 to 0.6 times Pa.

Upon making a decision in the step S103 that the lever signal is not in the first error range but in the second error range ($v < va4$ or $v > vb4$) shown in FIG. 7, the flow of processing proceeds to a step S105 to stop outputting control signal to any of the electromagnetic proportional valves 25 to 30 that is operated by the particular electric lever 51, 52 or 53. Next, information that an abnormality has occurred in any of the levers 51 to 53 is displayed on the indicator 55 in the step S11.

In the above, as long as the electric levers 51 to 53 are normal, lever signals are output within the normal range $va3 \le v \le vb3$ throughout the operation range of the levers 51 to 53 (characteristics g1 of FIG. 5). This causes the electromagnetic proportional valves 25 to 30 to be controlled based upon the characteristics f1 and f2 shown in FIG. 8 (the step S102), the predetermined maximum pilot pressure Pa to be applied to the direction control valves 22 to 24 when the levers are fully operated, and the hydraulic actuators 15 to 17 to be driven at high speed.

On the other hand, if output characteristics of the electric lever 51 is shifted to the characteristic g2 shown in FIG. 5 due to, for instance, worn pattern, the lever signal generated when the electric lever 51 is fully operated exceeds the normal range ($v < va3$). Similarly, an abrupt change in output characteristics of the electric lever 51 as the characteristics g3 and g4 shown in FIG. 5 due to wear dust of the patterns adhering to a part of the patterns or a part of the patterns having delaminated causes the lever signal to exceed the normal range. In this case, the electromagnetic proportional valves 25 and 26 are controlled based upon the characteristics f3 and f4 shown in FIG. 8 (the step S104).

Accordingly, the dead band, ranging from the neutral state of the lever to the point at which the control valve 22 is opened by lever operation, becomes wider compared to that in the normal state, thereby improving safety when the lever is operated. In addition, the maximum control pressure Pb achieved when the lever is fully operated is smaller than the maximum control pressure Pa in the normal state, and the maximum operation amount of the control valve 22 becomes smaller. This limits drive speed of the hydraulic actuator 15 when the lever is fully operated, thereby ensuring performing the minimum operation even if an abnormality has occurred in the electric lever 51.

On the other hand, in the event that, for instance, disconnection has occurred in wiring of the electric lever 51, the lever signal exceeds the first error range to be in the second error range. This stops output of control signals to the electromagnetic proportional valves 25 and 26 and causes pilot pressure not to apply to the direction control valve 22, so that the direction control valve 22 maintains a neutral position. Accordingly, the hydraulic actuator 15 maintains an inactive state, thereby preventing the hydraulic actuator 15 from undesirably driving. In this case, an abnormal state of the electric lever 51 is displayed on the indicator 55 so that an operator can easily recognize the abnormal state.

As described above, a decision is made as to whether or not the lever signals v of the electric levers 51 to 53 are within the normal range. If the lever signal is within the normal range, the corresponding electromagnetic proportional valve 25, 26, 27, 28, 29 or 30 is controlled based upon the characteristics f1 and f2 in the normal state. Whereas, if the lever signal is outside the normal state (the first error range), the corresponding electromagnetic proportional valve 25, 26, 27, 28, 29 or 30 is controlled based upon the characteristics f3 and f4 in an abnormal state. This enables the hydraulic actuators 15 to 17 to drive while limiting operations the actuators even if an abnormality has occurred in the lever signal v, thereby ensuring safe operation.

The dead band for the lever neutral state is widened when the lever signal v exceeds the normal range (to be in the first error range). Therefore, the hydraulic actuators 15 to 17 are not driven unless operation amount of the lever becomes greater, thereby enhancing safety in the event that an abnormality has occurred in the lever signal v. In addition, the maximum control pressure Pb applied to the control valves 22 to 24 is smaller than the maximum control pressure Pa in the normal state. Therefore, drive speed of the hydraulic actuators 15 to 17 is restricted, thereby ensuring safe operation.

Output of control signals to the electromagnetic proportional valves 25 to 30 is stopped when the lever signal v exceeds the first error range (to be in the second error range). Therefore, in the event that disconnection occurs in one of the signal lines of the electric levers 51 to 53, the corresponding hydraulic actuator 15, 16 or 17 is prohibited from being driven, thereby resulting in a high level of safety. In the event that an abnormality has occurred in the lever signal v from any of the electric levers 51 to 53, drive of only the corresponding hydraulic actuator 15, 16 or 17 operated by the particular electric lever 51, 52 or 53 is limited. Therefore, limitation imposed on the operation of the hydraulic actuators 15 to 17 can be minimized.

Figure 9:
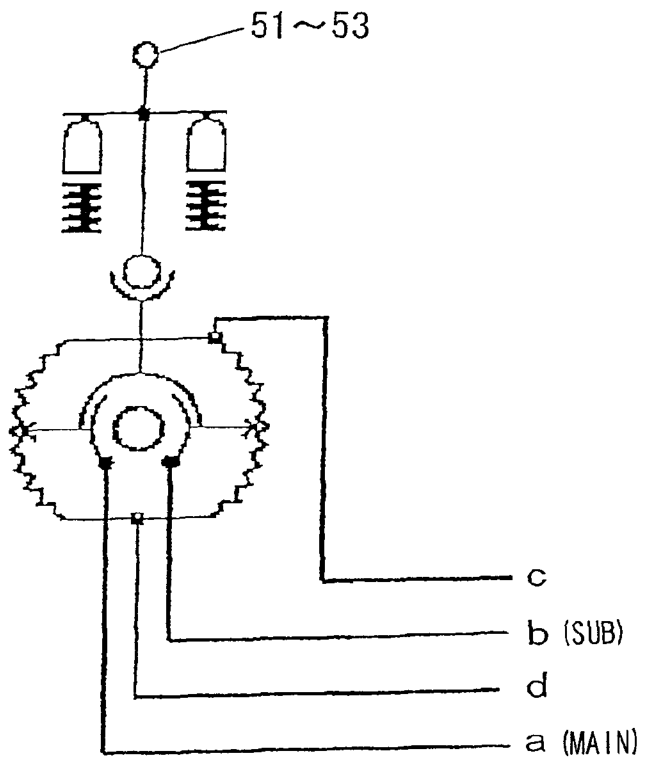
FIG. 9 shows an example of a variation of the electric lever.

It is to be noted that although in the above embodiment the lever signals v in correspondence to the operation amount of the levers are output from the electric levers 51 to 53 so as to control the electromagnetic proportional valves 25 to 30, the structures of the electric levers 51 to 53 are not limited to those described in reference to the embodiment. For instance, as FIG. 9 shows, signals in correspondence to the operation amount of the electric levers 51 to 53 may be picked up from a signal line a (main) and a signal line b (sub) so as to control the electromagnetic proportional valves 25 to 30 based upon output from the signal line a (main output vm) and output from the signal line b (sub output vs). Explanation on this point will now be given below. It is to be noted that in FIG. 9 a signal line c and a signal line d are connected to a power source and the ground, respectively.

Figure 10:
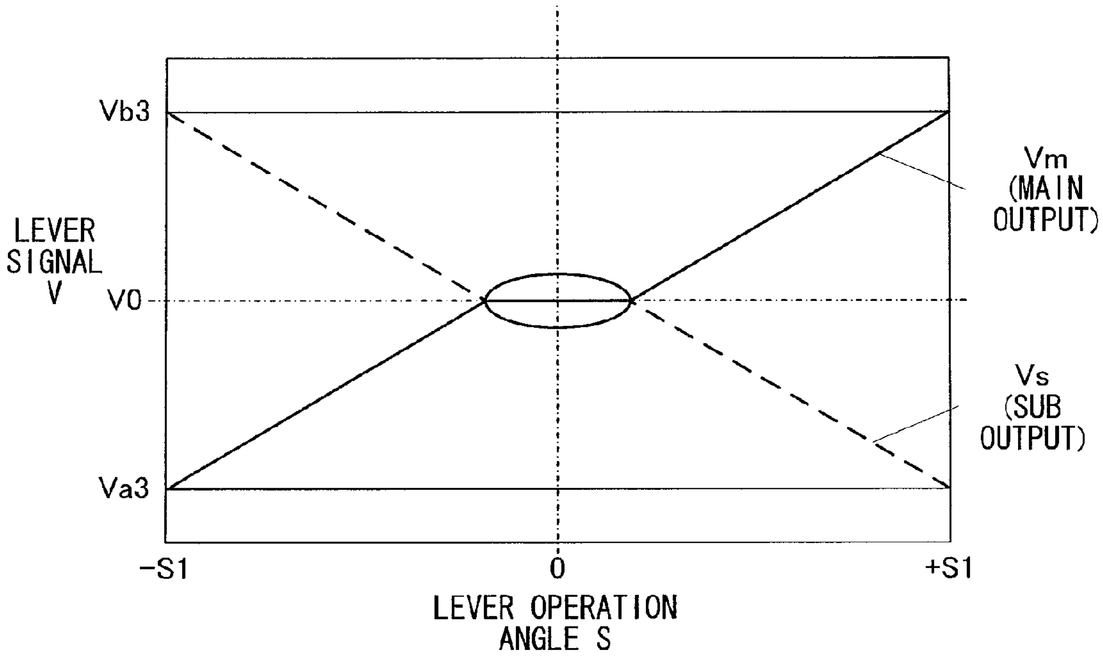
FIG. 10 shows an output characteristics of the electric lever of FIG. 9.

The electric levers 51 to 53 of FIG. 9 exhibit output characteristics in the normal state, for example, as shown in FIG. 10, in which the solid line and the dotted line indicate characteristics of the main output vm and the sub output vs, respectively. A mechanical dead band for the lever mechanism is provided near the neutral position of the lever. The main output vm and the sub output vs are symmetric with respect to each other relative to a reference signal v0, and the mean of the sum of the both outputs vmea (=(vm+vs)/2) is equal to the reference signal v0 regardless of the operation angle s of the lever.

If the mean vmea of the sum of the main output vm and the sub output vs is greater or smaller than the reference signal v0, it is decided that the lever signal v is abnormal. This enables an abnormality of the electric levers 51 to 53 to be determined even if output characteristics are shifted due to worn pattern, without the electric levers 51 to 53 being fully operated. In this case, if vmea and v0 are equal, the electromagnetic proportional valves 25 to 30 may be controlled based upon the characteristics f1 and f2 of FIG. 8. If the difference between vmea and v0 is equal to or less than a predetermined value, the electromagnetic proportional valves 25 to 30 may be controlled based upon the characteristics f3 and f4 of FIG. 8. If the difference between vmea and v0 exceeds the predetermined value, signal output to the electromagnetic proportional valves 25 to 30 may be stopped.

A decision may be made as to whether or not the main output vm and the sub output vs are each within the normal range. In the case where only the main output vm is not within the normal range, the electromagnetic proportional valves 25 to 30 maybe controlled based upon the characteristics f1 and f2 with the sub output vs as lever signal v, on the other hand, in the case where only the sub output vs is not within the normal range, the electromagnetic proportional valves 25 to 30 may be controlled based upon the characteristics f1 and f2 with the main output vm as lever signal v.

In the present embodiment, as FIG. 2 shows, signals from the power supply circuits 50*a* and 50*b* of the controller 50 are taken into the control circuit 50*c*, and an abnormality decision is also made as to the power supply circuits 50*a* and 50*b*. In this case, the control circuit 50*c* makes a decision as to whether or not signals from the power supply circuits 50*a* and 50*b* are equal to a predetermined voltage vx (5v). If the signals are not equal to the predetermined voltage vx, it is decided that an abnormality has occurred in the power supply circuits 50*a* and 50*b*. This allows a decision to be made as to whether an abnormality has occurred in the power supply circuits 50*a* and 50*b* or an abnormality has occurred in the electric lever itself in the event that the operation signal v is not within the normal range. Therefore, it is possible to identify in which part the failure has occurred. In the event that an abnormality has occurred in at least one of the power supply circuits 50*a* and 50*b* (e.g., 50*a*), only output of the electric levers 51 and 52, to which electric power is supplied from the power supply circuit 50*a*, may be disabled. This allows the electric lever 53 to be operated with no difficulty by power from the power supply circuit 50*b*, in which any abnormality has not occurred.

It is to be noted that although in the above embodiment (FIG. 2), the first abnormality detection circuit, which is constituted by the shuttle valves 41 to 43 and the pressure sensor 45, detects abnormality in output of the electromagnetic proportional valves 25 to 28 for driving the hydraulic actuators 15 and 16, as well as, the second abnormality detection circuit, which is constituted by the shuttle valve 44 and the pressure sensor 46, detects abnormality in output of the electromagnetic proportional valves 29 and 30 for driving the hydraulic actuator 17, the structures of the abnormality detection circuits may be varied depending upon the type of a hydraulic actuator. For instance, in the case where a hydraulic actuator of the same type as the hydraulic actuator 17 is provided, an abnormality decision may be made by using output, selected by a shuttle valve, of either the electromagnetic proportional valve for driving the said hydraulic actuator or the electromagnetic proportional valves 29 and 30 for driving the hydraulic actuator 17.

Although in the above, a single abnormality detection circuit detects an abnormality in output of the electromagnetic proportional valves 25 to 28 corresponding to the hydraulic actuators 15 and 16, which perform the same work operation, combination of the electromagnetic proportional valves is not limited to those mentioned above and may be varied appropriately. More specifically, not only the electromagnetic proportional valves 25 to 28, which are provided so as to perform the same work operation, but also any electromagnetic proportional valves may be grouped depending upon characteristics of individual working attachments and/or working conditions.

It is to be noted that in the above embodiment, the electric lever 51 is operated so as to output the lever signal v51 for expansion and contraction of the hydraulic cylinder 15, whereas the electric lever 52 is operated so as to output the lever signal v52 for forward and reverse rotations of the hydraulic motor 16, and the electromagnetic proportional valves 25 to 28 are controlled by the control circuit 50*c*, which is a control unit, so that control pressures outputted from the electromagnetic proportional valves 25 to 28 (the first electromagnetic proportional valve to the fourth electromagnetic proportional valve) match the control pressures P25 to P28 (the first control pressure to the fourth control pressure) calculated in correspondence to the lever signals v51 and v52. The shuttle valves 41 to 43 (high-pressure selection circuit) selects the maximum control pressure P1 from among the control pressures having been output from the electromagnetic proportional valves 25 to 28, so that the pressure sensor 45 detects the maximum control pressure P1. If the deviation ΔP1 between the maximum value P1max of the control pressures P25 to P28 and a detected pressure 21 exceeds a predetermined value, a decision that an abnormality has occurred in the electromagnetic proportional valves 25 to 28 is made, and the electromagnetic switching valve 47 is switched so as to prohibit the electromagnetic proportional valves 25 to 28 from controlling the direction control valves 22 and 23 (the first and second control valves).

In addition, in the above embodiment, the electric lever 53 is operated so as to output the lever signal v53 for expansion and contraction of the hydraulic cylinder 17, and the electromagnetic proportional valves 29 and 30 are controlled by the control circuit 50*c* so that control pressures outputted from the electromagnetic proportional valves 29 and 30 (the first and second electromagnetic proportional valves) are adjusted to the control pressures P29 and P30 (the first and second control pressures) calculated in correspondence to the lever signal v53. The shuttle valve 44 (high-pressure selection circuit) selects the maximum control pressure P2 from among the control pressures having been output from the electromagnetic proportional valves 29 and 30, so that the pressure sensor 46 detects the maximum control pressure P2. If the deviation ΔP2 between the maximum value P2max of the control pressures P29 and P30 and a detected pressure P2 exceeds a predetermined value, it is decided that an abnormality has occurred in the electromagnetic proportional valves 29 and 30, and the electromagnetic switching valve 48 is switched so as to prohibit the electromagnetic proportional valves 29 and 30 from controlling the direction control valve 24.

Moreover, in the above embodiment, the electric levers 51 to 53 are operated so as to respectively output the lever signals v51 to v53, and the electromagnetic proportional valves 25 to 30 are controlled by the control circuit 50*c* so that control pressures outputted from the electromagnetic proportional valves 25 to 30 (the first electromagnetic proportional valve to the sixth electromagnetic proportional valve) match the control pressures P25 to P30 (the first control pressure to the sixth control pressure) calculated in correspondence to the lever signals v51 to v53. The shuttle valves 41 to 43 (the first high-pressure selection circuit) selects the maximum control pressure 21 from among the control pressures having been output from the electromagnetic proportional valves 25 to 28, so that the pressure sensor 45 detects the maximum control pressure P1. The shuttle valve 44 (the second high-pressure selection circuit) selects the higher pressure P2 between the control pressures having been output from the electromagnetic proportional valves 29 and 30. If the deviation ΔP1 between the maximum value P1max of the control pressures P25 to P28 and the detected value P1 detected by the pressure sensor 45 (the first pressure sensor) exceeds a predetermined value, a decision that an abnormality has occurred in the electromagnetic proportional valves 25 to 28 is made, and the electromagnetic switching valve 47 is switched so as to prohibit the electromagnetic proportional valves 25 to 28 from controlling the direction control valves 22 and 23. If the deviation ΔP2 between the maximum value P2max of the control pressures P29 and P30 and the detected value P2 detected by the pressure sensor 46 (the second pressure sensor) exceeds a predetermined value, a decision that an abnormality has occurred in the electromagnetic proportional valves 29 and 30 is made, and the electromagnetic switching valve 48 is switched so as to prohibit the electromagnetic proportional valves 29 and 30 from controlling the direction control valve 24.

The above-described structure is an example, and the structure of the safety device is not limited to that described in reference to the embodiment. For instance, pressure selected by the shuttle valve 41 (the first high-pressure selection circuit) and pressure selected by the shuttle valve 42 (the second high-pressure selection circuit) may be respectively detected by pressure sensors (the first and second pressure sensors). Then, a decision as to abnormalities in the electromagnetic proportional valves 25 and 26 and in the electromagnetic proportional valves 27 and 28 may be made respectively based on the deviation between the pressure having passed through the shuttle valve 41 and the control pressures P25 and P26 and the deviation between the pressure having passed through the shuttle valve 42 and the control pressures P27 and P28. If it is decided that an abnormality has occurred in the electromagnetic proportional valves 25 and 26, operation of the direction control valve 22 maybe prohibited, whereas if a decision that an abnormality has occurred in the electromagnetic proportional valves 27 and 28 is made, operation of the direction control valve 23 may be prohibited. In a circuit not having the hydraulic actuator 16, pressure selected by the shuttle valve 41 (the first high-pressure selection circuit) and pressure selected by the shuttle valve 44 (the second high-pressure selection circuit) may be respectively detected by the pressure sensors 45 and 46 (the first and second pressure sensors). Then, a decision as to abnormalities in the electromagnetic proportional valves 25 and 26 and in the electromagnetic proportional valves 29 and 30 may be made respectively based on the deviation between the detected value P1 of the pressure sensor 45 and the control pressures P25 and P26 and the deviation between the detected value of the pressure sensor 46 and the control pressures P29 and P30 so as to prohibit operation of the direction control valves 22 and 24 accordingly.

Although in the above embodiment the shuttle valves 41 to 43 determine the maximum control pressure from the electromagnetic proportional valves 25 to 28, and the shuttle valve 44 determines the maximum control pressure from the electromagnetic proportional valves 29 and 30, the structure of a high-pressure selection circuit is not limited to that described in reference to the embodiment. Although the pressure sensors 45 and 46 detect the maximum control pressures, a pressure sensor is not limited to that described in reference to the embodiment. Although the electromagnetic switching valves 47 and 48 are switched so as to prohibit the electromagnetic proportional valves 25 to 30 from controlling the direction control valves 22 to 24, another prohibition device may be used. Although the attachment 5 for crusher is removably attached to the work fronts 3 and 4, another working attachment may be attached. Accordingly, the structure of a hydraulic actuator is not limited to that described in reference to the embodiment.

Although the above embodiment is adopted in a crusher (FIG. 1), which is based upon a hydraulic excavator, the above embodiment may be adopted in the same manner in other hydraulic working machines. Namely, as long as the features and functions of the present invention are realized effectively, the present invention is not limited to the safety device for hydraulic working machine achieved in the embodiment.

The disclosure of the following priority application is herein incorporated by reference:

Japanese Patent Application No. 2007-50756 (filed on 28 Feb. 2007)

The invention claimed is:

1. A safety device for hydraulic working machine, comprising:

a hydraulic source;

at least first and second hydraulic actuators that are driven by pressure oil from the hydraulic source;

first and second control valves that control flow of pressure oil from the hydraulic source to the first and second hydraulic actuators;

first and second electric lever devices that output first and second electrical operation signals, which are drive instructions for the first hydraulic actuator and second hydraulic actuator respectively, in correspondence to lever operation;

first and second electromagnetic proportional valves through which control pressures for controlling the first control valve are output;

third and fourth electromagnetic proportional valves through which control pressures for controlling the second control valve are output;

a pressure calculating unit that calculates first and second control pressures in correspondence to a first operation signal that is output from the first electric lever device, and calculates third and fourth control pressures in correspondence to a second operation signal that is output from the second electric lever device;

a control unit that controls the first and second electromagnetic proportional valves so that control pressures to be output from the first and second electromagnetic proportional valves become the first and second control pressures that have been calculated by the pressure calculating unit, and controls the third and fourth electromagnetic proportional valves so that control pressures to be output from the third and fourth electromagnetic proportional valves become the third and fourth control pressures that have been calculated by the pressure calculating unit;

a high-pressure selection circuit that selects a maximum control pressure from among control pressures that have been output from the first to fourth electromagnetic proportional valves;

a pressure detector that detects a control pressure selected by the high-pressure selection circuit;

an abnormality determination unit that determines an abnormality in the first to fourth electromagnetic proportional valves based upon the control pressure detected by the pressure detector and the first to fourth control pressures calculated by the pressure calculating unit; and an inhibiting device that prohibits the first to fourth electromagnetic proportional valves from controlling the first and second control valves when the abnormality determination unit determines that an abnormality has occurred in the first to fourth electromagnetic proportional valves, wherein:

said control unit determines whether the first operation signal output from the first electric lever device and the second operation signal output from the second electric lever device are abnormal, and when said control unit determines that the first operation signal output from the first electric lever device or the second operation signal output from the second electric lever device is abnormal, the pressure calculating unit calculates the first and second control pressures or the third and fourth control pressures to be smaller than the first and second control pressures or the third and fourth control pressures calculated when the first operation signal or the second operation signal is normal.

2. A safety device for hydraulic working machine according to claim 1, wherein:

said control unit determines whether the first operation signal output from the first electric lever device and the second operation signal output from the second electric lever device fall in a normal range, in a first error range ranging beyond the normal range by a predetermined value, or in a second error range ranging further beyond the first error range;

when said control unit determines that the first operation signal output from the first electric lever device or the second operation signal output from the second electric lever device falls in the first error range, the pressure calculating unit calculates the first and second control pressures or the third and fourth control pressures to be smaller than those calculated when the first operation signal or the second operation signal falls in the normal range; and when said control unit determines that the first operation signal output from the first electric lever device or the second operation signal output from the second electric lever device falls in the second error range, the control unit stops outputting a control signal of the first and second control pressures corresponding to the first operation signal or a control signal of the third and fourth control pressures corresponding to the second operation signal.

3. A safety device for hydraulic working machine, comprising:

a hydraulic source;

at least first, second, and third hydraulic actuators that are driven by pressure oil from the hydraulic source;

first, second, and third control valves that control flow of pressure oil from the hydraulic source to the first, second, and third hydraulic actuators, respectively; first, second, and third electric lever devices that output first, second and third electrical operation signals, which are drive instructions for the first, second, and third hydraulic actuators respectively, in correspondence to lever operation;

first and second electromagnetic proportional valves through which control pressures for controlling the first control valve are output;

third and fourth electromagnetic proportional valves through which control pressures for controlling the second control valve are output;

fifth and sixth electromagnetic proportional valves through which control pressures for controlling the third control valve are output;

a pressure calculating unit that calculates first and second control pressures in correspondence to a first operation signal that is output from the first electric lever device, third and fourth control pressures in correspondence to a second operation signal that is output from the second electric lever device, and fifth and sixth control pressures in correspondence to a third operation signal that is output from the third electric lever device;

a control unit that controls the first to sixth electromagnetic proportional valves so that control pressures to be output from the first to sixth electromagnetic proportional valves respectively become the first to sixth control pressures that have been calculated by the pressure calculating unit;

a first high-pressure selection circuit that selects a maximum control pressure from among control pressures that have been output from the first to fourth electromagnetic proportional valves;

a second high-pressure selection circuit that selects a higher pressure between control pressures that have been output from the fifth and sixth electromagnetic proportional valves;

a first pressure detector that detects the control pressure selected by the first high-pressure selection circuit;

a second pressure detector that detects the control pressure selected by the second high-pressure selection circuit;

an abnormality determination unit that determines an abnormality in the first to fourth electromagnetic proportional valves based upon the control pressure detected by the first pressure detector and the first to fourth control pressures calculated by the pressure calculating unit, and determines an abnormality in the fifth and sixth electromagnetic proportional valves based upon the control pressure detected by the second pressure detector and the fifth and sixth control pressures calculated by the pressure calculating unit; and an inhibiting device that prohibits the first to fourth electromagnetic proportional valves from controlling the first and second control valves when the abnormality determination unit determines that an abnormality has occurred in the first to fourth electromagnetic proportional valves, and prohibits the fifth and sixth electromagnetic proportional valves from controlling the third control valve when the abnormality determination unit determines that an abnormality has occurred in the fifth and sixth electromagnetic proportional valves, wherein:

said control unit determines whether the first operation signal output from the first electric lever device, the second operation signal output from the second electric lever device, and the third operation signal output from the third electric lever device are abnormal, and when said control unit determines that the first operation signal output from the first electric lever device, the second operation signal output from the second electric lever device or the third operation signal output from the third electric lever device is abnormal, the pressure calculating unit calculates the first and second control pressures, the third and fourth control pressures or the fifth and sixth control pressures to be smaller than the first and second control pressures, the third and fourth control pressures or the fifth and sixth control pressures calculated when the first operation signal, the second operation signal or the third operation signal is normal.

4. A safety device for hydraulic working machine according to claim 3, wherein:

the first and second hydraulic actuators are actuators for performing one operation, whereas the third hydraulic actuator is an actuator for performing another operation.

5. A safety device for hydraulic working machine according to claim 4, wherein:

the hydraulic working machine includes an undercarriage, a revolving superstructure, a work front that is rotatably supported by the revolving superstructure, and a working attachment that is removably attached to the work front; and the first and second hydraulic actuators are driving actuators for the working attachment.

6. A safety device for hydraulic working machine according to claim 3, wherein:

said control unit determines whether the first operation signal output from the first electric lever device, the second operation signal output from the second electric lever device and the third operation signal output from the third electric lever device fall in a normal range, in a first error range ranging beyond the normal range by a predetermined value, or in a second error range ranging further beyond the first error range;

when said control unit determines that the first operation signal output from the first electric lever device, the second operation signal output from the second electric lever device or the third operation signal output from the third electric lever device falls in the first error range, the pressure calculating unit calculates the first and second control pressures, the third and fourth control pressures or the fifth and sixth control pressures to be smaller than those calculated when the first operation signal, the second operation signal or the third operation signal falls in the normal range; and when said control unit determines that the first operation signal output from the first electric lever device, the second operation signal output from the second electric lever device or the third operation signal output from the third electric lever device falls in the second error range, the control unit stops outputting a control signal of the first and second control pressures corresponding to the first operation signal, a control signal of the third and fourth control pressures corresponding to the second operation signal or a control signal of the fifth and sixth control pressures corresponding to the third operation signal.

* * * * *